US009258317B2

(12) United States Patent
Yao et al.

(10) Patent No.: US 9,258,317 B2
(45) Date of Patent: Feb. 9, 2016

(54) DEVICE AND METHOD FOR DATA MATCHING AND DEVICE AND METHOD FOR NETWORK INTRUSION DETECTION

(71) Applicant: NSFOCUS INFORMATION TECHNOLOGY CO., LTD., Beijing (CN)

(72) Inventors: Gang Yao, Beijing (CN); Xiao Han, Beijing (CN); Tao Zhang, Beijing (CN); Peng Han, Beijing (CN); Lijun Cheng, Beijing (CN)

(73) Assignee: NSFOCUS INFORMATION TECHNOLOGY CO., LTD., Beijing (CN)

( * ) Notice: Subject to any disclaimer, the term of this patent is extended or adjusted under 35 U.S.C. 154(b) by 10 days.

(21) Appl. No.: 13/797,171

(22) Filed: Mar. 12, 2013

(65) Prior Publication Data

US 2013/0191916 A1  Jul. 25, 2013

Related U.S. Application Data

(63) Continuation of application No. PCT/CN2011/080308, filed on Sep. 28, 2011.

(30) Foreign Application Priority Data

Nov. 1, 2010 (CN) .......................... 2010 1 0532853

(51) Int. Cl.
*H04L 29/06* (2006.01)
(52) U.S. Cl.
CPC .................................. *H04L 63/1408* (2013.01)
(58) Field of Classification Search
CPC ........................ H04L 63/1416; H04L 63/1408
USPC .......................................................... 726/23
See application file for complete search history.

(56) References Cited

U.S. PATENT DOCUMENTS 7,730,011 B1 * 6/2010 Deninger ............ H04L 63/1408
707/602
2005/0273450 A1 * 12/2005 McMillen et al. ................ 707/1
(Continued)

FOREIGN PATENT DOCUMENTS

CN 101841546 A 9/2010
CN 102075511 A 5/2011
(Continued)

OTHER PUBLICATIONS

Xu Qian et al., "Efficient Regular Express Compression Algorithm for Deep Packet Inspection" Journal of Software, Aug. 2009, vol. 20, No. 8, pp. 2214-2220.
(Continued)

*Primary Examiner* — Joseph P Hirl
*Assistant Examiner* — J. Brant Murphy
(74) *Attorney, Agent, or Firm* — J.C. Patents

(57) ABSTRACT

The present invention discloses a device and method for data matching and a device and method for network intrusion detection. The method for data matching includes: searching in a regular expression set one or more complex regular expressions causing a sharp increase in number of states generated based on a regular expression during interaction; constructing a corresponding simplified expression for each complex regular expression; compiling a simplified state machine; compiling one or more substate machines, wherein each of the one or more substate machines is compiled based on a corresponding one of the one or more complex regular expressions; and matching data based on the simplified state machine and the one or more substate machines. The present invention further discloses a device for data matching employing the method for data matching and a device and method for intrusion detection employing the device and method for data matching.

12 Claims, 5 Drawing Sheets

(56) References Cited

U.S. PATENT DOCUMENTS

| | | | | |
|---|---|---|---|---|
| 2006/0085389 | A1* | 4/2006 | Flanagan et al. | 707/2 |
| 2006/0107321 | A1* | 5/2006 | Tzadikario | H04L 63/0227 726/22 |
| 2007/0282833 | A1* | 12/2007 | McMillen | 707/6 |
| 2009/0172001 | A1* | 7/2009 | McMillen | 707/101 |
| 2010/0131935 | A1* | 5/2010 | Wang | 717/143 |
| 2010/0138367 | A1* | 6/2010 | Yamagaki | G06F 17/30985 706/12 |
| 2010/0192225 | A1* | 7/2010 | Ma et al. | 726/23 |
| 2012/0005184 | A1* | 1/2012 | Thilagar | G06F 17/30979 707/706 |
| 2012/0110003 | A1* | 5/2012 | Brewer | G06F 17/30985 707/769 |

FOREIGN PATENT DOCUMENTS

| | | |
|---|---|---|
| CN | 102075511 B | 5/2014 |
| EP | 1 335 557 A1 | 8/2003 |

OTHER PUBLICATIONS

Chinese First Examination Report of China Application No. 201010532853.1, dated Dec. 25, 2012.

International Search Report of International Application No. PCT/CN2011/080308, dated Jan. 5, 2012.

Japanese Examination Report of Japan Patent Application No. 2013-535257, dated Jun. 3, 2014.

* cited by examiner

DEVICE AND METHOD FOR DATA MATCHING AND DEVICE AND METHOD FOR NETWORK INTRUSION DETECTION

CROSS-REFERENCE TO RELATED APPLICATIONS

This application is a continuation of International Application No. PCT/CN2011/080308, filed on Sep. 28, 2011, which claims the priority benefit of China Patent Application No. 201010532853.1, filed on Nov. 1, 2010. The contents of the above identified applications are incorporated herein by reference in their entireties.

FIELD OF THE TECHNOLOGY

The present invention relates to the field of network security, and in particular, to a device and method for network intrusion detection and a device and method for data matching based on regular expression adopted therein, for matching data based on a regular expression set including one or more regular expressions.

BACKGROUND

In the field of network intrusion detection, a regular expression is frequently used to detect whether network data includes malicious data in a specific format so as to judge whether a network intrusion occurs. Since the regular expression has features of flexibility and good expression ability, it is widely used in the field of network intrusion detection.

In order to use the regular expression to match data, a regex engine generally needs to be constructed based on the regular expression. There are currently two types of regex engines, Non-deterministic Finite Automaton (NFA) regex engines and Deterministic Finite Automaton (DFA) regex engines. However, because the backtracking feature of NFA can not be changed, the matching speed of NFA can not be significantly improved. Therefore, the DFA regex engine is widely used currently. However, DFA itself has a problem of state expansion of a state machine.

Basic working principles of a DFA regex engine are as follows: firstly, pre-compile a regular expression (or all regular expressions in a regular expression set), according to specific rules, into a deterministic finite state machine; use a character string to be checked as an input of the finite state machine to induce state transitions of the finite state machine; and check whether the character string has been matched with a specific regular expression during a state-transition process of the state machine. Each state in the finite state machine includes two basic elements: (1) a match list and (2) a state transition array. The match list includes a serial number of the regular expression, if the match list is not null, it indicates that the input data stream has matched with the regular expression corresponding to the serial number when the state machine runs to this state; otherwise, no matching occurs. As to the state transition array, the current state is required to be able to decide which state to jump to according to an input character; the length of the state transition array is just the number of all possible input characters; the indices of the state transition array are just all the possible input characters; and a value of the state transition array is just the serial number of a state to jump to when a character corresponding to the index is input under the current state.

The state transition array is the cause of state expansion of a DFA engine. Supposing that an input character set is an American standard code for information interchange (ASCII) table, the state transition array of each state is just an int type or short type array with a length of 256, and occupies a memory of 1K or 512 B. Due to complexity of the network intrusion, in practical network intrusion detection, a plurality of complex regular expressions may be applied to the same segment of network data for matching, and thereby the state number of the DFA state machine obtained by compiling may reach an order of magnitude of $10^4$ to $10^5$, which will lead to memory exhaustion of a system.

Three solutions are available to the state expansion problem of the DFA regex engine currently:

1. A method for reducing the number of state transitions of a DFA state machine is disclosed in the article "Algorithms to accelerate multiple regular expressions matching for deep packet inspection[c]" *Proceedings of the 2006 Conference on Applications, Technologies, Architectures and Protocols for Computer Communications*. New York: ACM press, 2006: 229-350 by KUMAR S, DHARMAPURIKAR S, YU F, et al in 2006, the article "Advanced algorithms for fast and scalable deep packet inspection[c]" *Proceedings of the 2006 ACM/IEEE Symposium on Architecture for Networking and Communication Systems*. New York: ACM Press, 2006: 81-92 by KUMAR S, YURENER, WILLIAMS J., et al in 2006, and the article "An improved DFA for fast regular expression matching [J]" *ACM SIGCOMM Computer Communication Review*, 2008, 38(5):29-40 by FACARA D, ESTAN C, J H A S., PROCISSI G, et al in 2008 (the contents of the above articles are incorporated herein by reference in their entirety). The method for reducing the number of state transitions of the DFA state machine saves memory by adding "edge"; however, the method has following problems: A transition path of the state machine is longer due to the introduced "edge", so that matching efficiency of the regex engine is lowered. In addition, the method is lack of universality, and "edge" may not be added for all states. The memory-saving effect of the method depends on a ratio of states capable of adding "edge" to all the states, and thereby ultimately depends on the regular expression. That is, for some regular expressions, the method can better save the memory; whereas, for some other regular expressions, the memory saving effect will be poor. This method is not suitable for a network intrusion detection system that needs to use a large number of regular expressions.

2. A method for reducing the number of states of a DFA state machine is disclosed in the article "Xfa: Faster signature matching with extended automata[c]" *Proceedings of the 2008 IEEE Symposium on Security and Privacy*. Washington, D.C.: IEEE, 2008:187-201 by SMITH R, ESTAN C, J H A S, et al in 2008, and the article "Memory-efficient regular expression search using state merging[c]" *INFOCOM 2007: 26th IEEE International Conference on Computer Communications*. Washington D.C.: IEEE, 2007:1064-1072 by BECCHI M and CADAMBI S in 2007 (the contents of the above articles are incorporated herein by reference in their entirety). The method for reducing the number of states of the DFA state machine compresses the states in the DFA state machine by introducing a state bit so as to reduce the number of states. However, the method for reducing the number of states of the DFA state machine also has the following defects: firstly, a memory occupied by additional information (state bits) introduced by the method can not be ignored when the DFA state machine is comparatively complex; secondly, the method is also lack of universality, for example, the method may better solve a problem of state expansion of a regular expression .*ab.*cd|.*ef.*g, but can not solve a state expansion caused by a regular expression .*ab[^\n]*cd|.*ef[^\n]*gh.

3. A method for alphabet compression is disclosed in the article "An improved algorithm to accelerate regular expression evaluation[c]" *Proceedings of the 3rd ACM/IEEE Symposium on Architecture for Networking and Communications Systems*. New York: ACM Press, 2007: 145-154 by BECCHI M and CROWLEY P in 2007 (the contents of the above article are incorporated herein by reference in their entirety). The method for alphabet compression shortens the length of state transition array of each state in the state machine by compressing the alphabet, so as to reduce memory consumption of a DFA state machine. However, the method has following defects: the length of the state transition array is shortened by adopting the method for alphabet compression, but mapping between a compressed alphabet and a complete alphabet needs to be performed during an actual state transition process, which will reduce matching efficiency of the DFA state machine; moreover, the method is only suitable for a situation that the same target state can be reached when characters are received in different source states, and an application scope of the method is very limited.

It can be seen from the above that, although various solutions are proposed to solve the state expansion problem of the DFA regex engine, these solutions still have obvious defects. A novel technical solution capable of better solving the state expansion problem of the DFA is needed.

SUMMARY

Accordingly, the present invention provides a device and method for data matching based on regular expression for matching data based on a regular expression set including one or more regular expressions so as to overcome or partially solve the problems above, and a device and method for network intrusion detection.

According to one aspect of the present invention, a method for data matching based on regular expression for matching data based on a regular expression set including one or more regular expressions is provided. The method includes steps of: searching, in a regular expression set, for one or more complex regular expressions which cause a sharp increase in the number of states generated based on the regular expression during interaction; constructing a corresponding simplified expression for each of the one or more searched-out complex regular expressions; compiling a simplified state machine based on the constructed simplified expression and remaining regular expressions except for the one or more searched-out complex regular expressions in the regular expression set; compiling one or more substate machines, where each of the one or more substate machines is compiled based on a corresponding one of the one or more complex regular expressions; and matching data based on the simplified state machine and the one or more substate machines.

Optionally, the complex regular expression includes one or more of the following types of regular expressions: a regular expression in such a form as subpattern1.*subpattern2, a regular expression in such a form as subpattern1.+subpattern2, a regular expression in such a form as subpattern{m,n}, and a regular expression in such a form as subpattern{m}.

Optionally, the step of constructing a simplified expression corresponding to the complex regular expression includes: dividing the complex regular expression into one or more character string features separated by one or more regular features, where the regular feature refers to a regular syntax in the complex regular expression, and the character string feature refers to a fixed character string present in the complex regular expression and separated by the regular syntax; and connecting the one or more character string features according to a sequence of the one or more character string features in the complex regular expression so as to construct the simplified expression.

Optionally, the matching data based on the simplified state machine and the one or more substate machines includes: performing first data matching using the simplified state machine; and performing second data matching using the substate machine corresponding to the complex regular expression which corresponds to the simplified expression if a result of the first data matching indicates that data matches the simplified expression; and determining that the data matches the complex regular expression if a result of the second data matching indicates that the data matches the complex expression.

According to another aspect of the present invention, a data matching device for matching data based on a regular expression set including one or more regular expressions is provided. The data matching device includes: a regular expression set preprocessor, configured to search, in a regular expression set, for one or more complex regular expressions which cause a sharp increase in the number of states generated based on the regular expression during interaction; a complex regular expression simplifier, configured to construct a corresponding simplified expression for each of the one or more complex regular expressions searched out by the regular expression set preprocessor; a simplified expression compiler, configured to compile a simplified state machine based on the simplified expression from the complex regular expression simplifier and remaining regular expressions in the regular expression set from the regular expression set preprocessor; a substate machine compiler, configured to compile a corresponding substate machine for each of the one or more complex regular expressions searched out by the regular expression set preprocessor; and a data matcher, configured to match data based on the simplified state machine from the simplified expression compiler and the substate machine from the substate machine compiler.

According to the data matching method and device of the present invention a process of matching data based on the regular expression includes two stages: in a first stage, the simplified regular expression replaces the complex regular expression to perform matching; and only if the simplified regular expression is matched up in the first stage, matching based on an actual complex regular expression in a second stage will be performed. Therefore, state expansion may not occur to the generated state machine by replacing the complex regular expression with the simplified regular expression according to the method and device for data matching of the present invention. Meanwhile, as the simplified regular expression can inherit features of an original complex regular expression to a greatest extent, the probability of matching data again in the second stage is very small, which ensures that matching efficiency does not decrease significantly. Therefore, the state expansion problem of the existing DFA regular engine is solved according to the method and device for data matching of the present invention with an acceptable performance loss.

According to a further aspect of the present invention, a method for network intrusion detection is provided, where the method for data matching of the present invention is employed in judging whether the received network data is network intrusion data.

According to a further aspect of the present invention, a device for network intrusion detection is provided, where the device for data matching of the present invention is employed in judging whether the received network data is network intrusion data.

BRIEF DESCRIPTION OF THE DRAWINGS

To describe the technical solutions in the embodiments of the present invention or in the prior art more clearly, the following briefly introduces the accompanying drawings needed for describing the embodiments or the prior art. Apparently, the accompanying drawings in the following description show merely some embodiments of the present invention, and a person having ordinary skill in the art may still derive other drawings from the accompanying drawings without creative efforts.

DETAILED DESCRIPTION

To make the objectives, technical solutions and advantages of the embodiments of the present invention more comprehensible, the following describes the technical solutions of the embodiments of the present invention clearly and completely with reference to the accompanying drawings of the embodiments of the present invention. Apparently, the described embodiments are merely a part rather than all of the embodiments of the present invention. All other embodiments derived by a person having ordinary skill in the art based on the embodiments of the present invention without creative efforts shall fall within the protection scope of the present invention.

Before describing the embodiments of the present invention, causes to a state expansion problem of a state machine in a DFA regex engine are analyzed. It may be considered that most state expansion problems are caused by interaction of regular expressions. For example, if two regular expressions {pattern1} and {pattern2} are respectively and independently compiled, the state expansion problems will not occur. However, the state expansion problems may occur if the regular expressions {pattern1} and {pattern2} are used as a regular expression group (equivalent to a new regular expression pattern1|pattern2) and compiled together. It is further found by study that only interactions between the complex regular expressions with certain specific features may cause expansion of the number of states. Such complex regular expressions are, for example, as follows:

1. Regular expressions in such a form as {subpattern1}.*{subpattern2} or {subpattern1}.+{subpattern2}; where the {subpattern1}.*{subpattern2} refers to including zero or more than zero of any character/characters between a subexpression subpattern1 and a subexpression subpattern2; and the {subpattern1}.+{subpattern2} refers to including one or more than one of any characters between the subexpression subpattern1 and the subexpression subpattern2. A feature of such regular expressions is that subexpressions (.*) and (.+) with unspecified lengths and unlimited maximum possible lengths appear in the regular expressions. Accordingly, the regular expressions may cause the number of states of a DFA state machine to increase exponentially during their interactions, such as being used in the same regular expression set.

Figure 1:
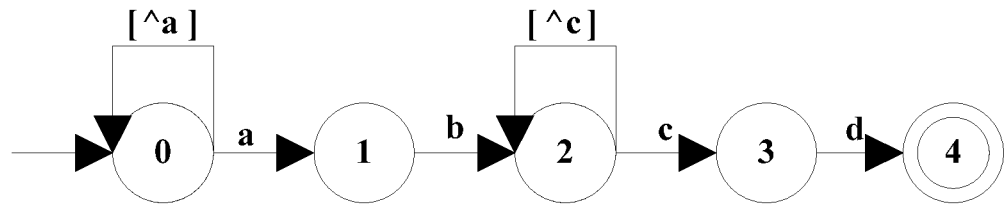
FIG. 1 is a schematic diagram of a state machine corresponding to a complex regular expression.
Figure 2:
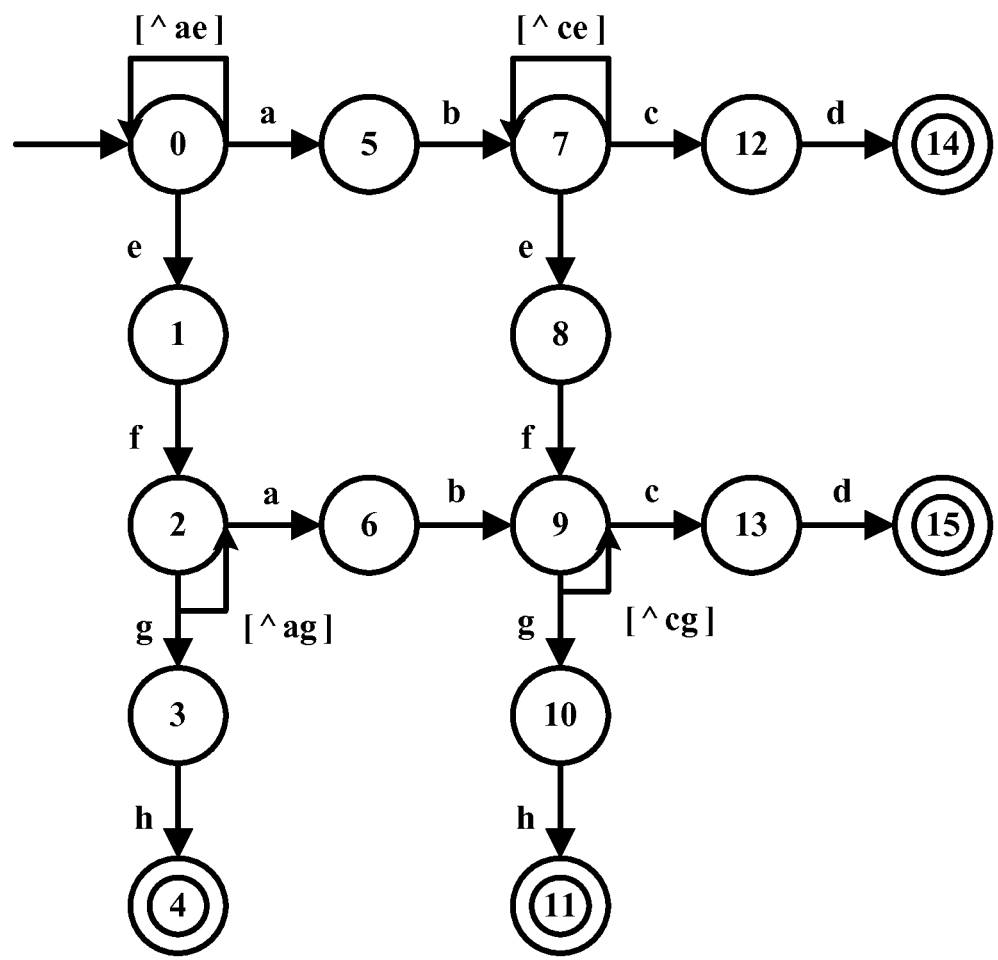
FIG. 2 is a schematic diagram of a state machine corresponding to two complex regular expressions.

For example, FIG. 1 illustrates a state machine obtained by compiling a regular expression .*ab.*cd, while FIG. 2 illustrates a corresponding state machine when a regular expression .*ef.*gh and a regular expression .*ab.*cd with similar formats interact with each other in the same regular expression set. According to the state machines illustrated in FIG. 1 and FIG. 2 it can be seen that the number of states increases geometrically (exponentially) rather than linearly when the complex regular expression .*ef.*gh and the complex regular expression .*ab.*cd are interacting.

Figure 3:
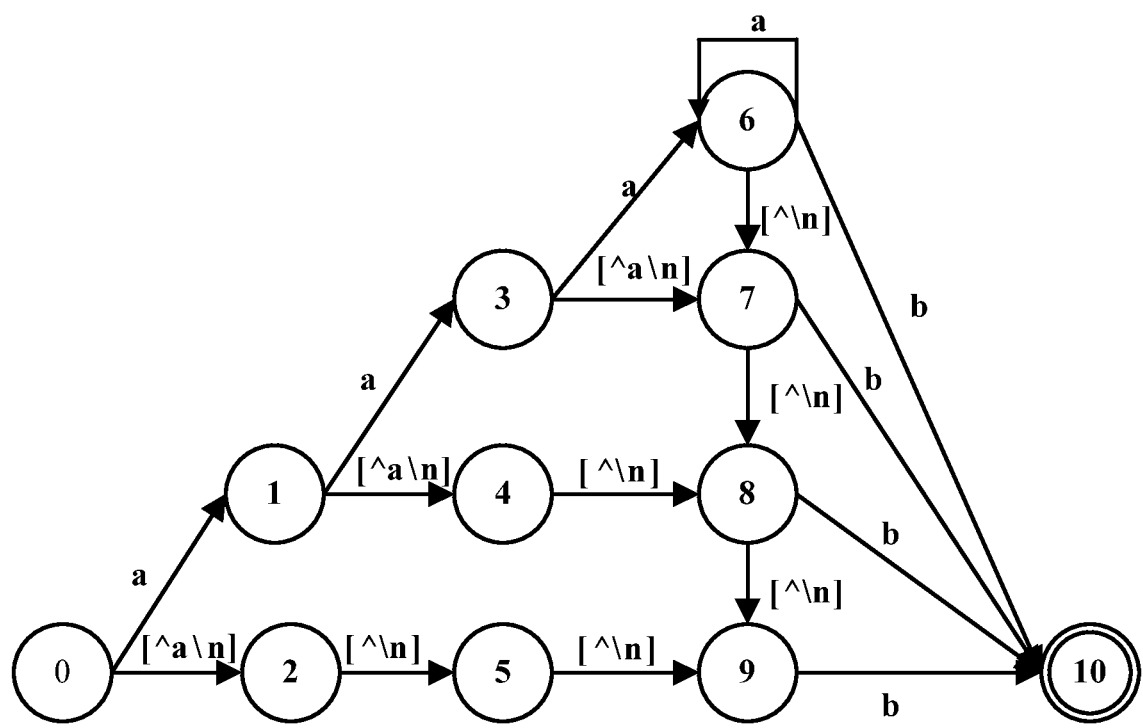
FIG. 3 is a schematic diagram of a state machine corresponding to another complex regular expression.

2. Complex regular expressions in such forms as subpattern{m,n} and subpattern{m}, where the regular expression subpattern{m,n} refers to repeating the subexpression subpattern multiple times, at least m times but no more than n times. The regular expression subpattern{m} may be understood as a special case of the subpattern{m,n}, refers to repeating the subpattern m times. Both of the two regular expressions may cause the number of states of a corresponding state machine to increase in a square level. For example, FIG. 3 illustrates a DFA state machine corresponding to a regular expression a+[^\n]{3}b (meaning of the regular expression is that: character a is repeated for more than once; afterwards, there are three non \n characters, and one character b). As illustrated in the FIG. 3, the DFA state machine needs about $3^2$ states to describe the regular expression a+[^\n]{3}b. If it is repeated 1024 times, the number of states of the DFA is in an order of $1024^2$. In addition, the expressions of these types may further generate more radical state expansions during interaction.

Assuredly, complex regular expressions, which may cause expansion of the number of states, are not limited to specific examples given above. Moreover, other regular expressions including a subexpression with uncertain length or a subexpression repeated for a plurality of times may be further considered as the complex regular expressions described in the present invention. Based on the examples, a person skilled in the art may conceive other regular expressions belonging to the complex regular expressions described in the present invention without going beyond the protection scope of the present invention.

In view of that the complex regular expressions are causes to expansion of the number of states of a corresponding state machine; if the complex regular expressions are preprocessed during the construction of the state machine, the problem of expansion of the number of states may possibly be eliminated. The present invention is invented accordingly.

Figure 4:
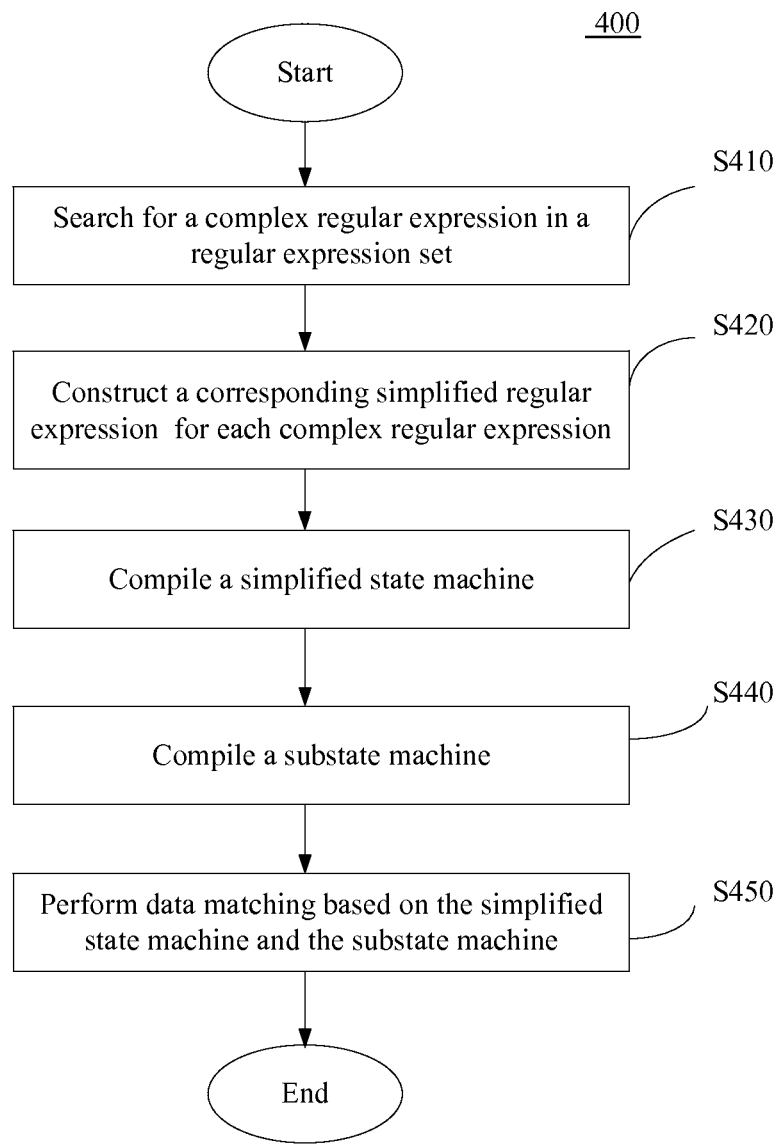
FIG. 4 is a flow chart of a method for data matching based on a regular expression set according to an embodiment of the present invention.

FIG. 4 is a flow chart of a method for data matching 400 based on a regular expression set according to an embodiment of the present invention. The regular expression set includes one or more regular expressions. During data matching, all the regular expressions in the regular expression set need to be used for data matching so as to judge which regular expression or expressions in the regular expression set match the data to be matched.

The method for data matching 400 starts with step S410, searching, in the regular expression set, for one or more complex regular expressions which cause a sharp increase in the number of states generated based on the regular expression during interaction. Specific examples of the complex regular expressions have been given above.

Subsequently, in step S420, a corresponding simplified expression is constructed for each of the one or more searched complex regular expressions. A principle of constructing the corresponding simplified regular expression for each complex regular expression is that the simplified regular expression constructed may inherit features of an original complex regular expression to a greatest extent, so as to reduce the case of data matching with the simplified regular expression but not matching with the original complex regular expression as much as possible.

Optionally, according to an embodiment of the present invention, the constructing the corresponding simplified regular expression for each complex regular expression includes following steps:

1. The complex regular expression is divided into one or more character string features separated by one or more regular features, where the regular feature refers to a regular syntax in the complex regular expression, and the regular syntax is the syntax well-known in the field of regular expressions, which may be easily obtained by a person having ordinary skill in the art. The character string feature refers to a fixed character string present in the complex regular expression and spaced by the regular grammars.

For example, for two regular expressions below:

Regular expression 1: REPORT\s+V svn[^\n]*HTTPV 1\.1; the regular expression 1 is a regular expression relevant to the Hypertext Transport Protocol (HTTP), where REPORT, V svn and HTTPV 1\.1 are character string features thereof; and \s+ and [^\n]* are regular features thereof.

Regular expression 2: dbms_output.put_line(SYS.OLAPIMPL_T.ODCITABLESTART[^)]{300}; the regular expression 2 is a regular expression for buffer overflow attack detection, where dbms_output.put_line (SYS.OLAPIMPL_T.ODCITABLESTART is a character string feature thereof and [^)]{300} is a regular feature thereof.

2. The character string features which are obtained by dividing are connected according to a sequence of one or more character string features in the complex regular expression so as to construct the simplified regular expression.

For example, for the regular expression 1: REPORT\s+V svn[^\n]*HTTPV 1\.1, a simplified regular expression constructed is REPORT.*V svn.*HTTPV 1\.1;

however, for the regular expression 2: dbms_output.put_line(SYS.OLAPIMPL_T.ODCITABLESTART[^)]{300}, a simplified regular expression constructed is dbms_output.put_line(SYS.OLAPIMPL_T.ODCITABLESTART.

It should be noted here ".*" in the simplified regular expression "REPORT.* V svn.*HTTPV 1\.1" corresponding to the regular expression 1 only represents a fore-and-aft relationship and does not have a practical regular syntax meaning. According to an embodiment of the present invention, the simplified regular expression is divided into three regular expressions "REPORT", "V svn" and "HTTPV 1\.1" and the three regular expressions are respectively compiled in a practical compiling process; connecting the three regular expressions together by ".*" is to express logic relationships between them. It may be considered that the simplified regular expression "REPORT.*V svn.*HTTPV 1\.1" is matched only when the three regular expressions "REPORT", "V svn" and "HTTPV 1\.1" are matched in sequence.

According to an embodiment of the present invention, all the character string features in the complex regular expression are connected so as to construct the simplified regular expression. However, according to another embodiment of the present invention, only some important character string features may be connected and some unimportant or inconspicuous character string features may be ignored.

For example, a complex regular expression "and [^\n)]+between[^\n)]+)" is divided into three character string features "and", "between" and ")" according to the method. If all the character string features are connected so as to construct a simplified regular expression, a simplified regular expression "and.*between.*)" is obtained so as to match "and", "between" and ")" in sequence during a matching process. However, as the character string feature ")" appears in an input data stream comparatively frequently, the feature ")" is considered as an inconspicuous feature. In this way, the simplified regular expression corresponding to the complex regular expression "and [^\n)]+between[^\n)]+)" is "and.*between".

Several specific embodiments illustrating the constructing of a simplified expression corresponding to the complex regular expression in step S420 are given above. However, based on the given examples, a person skilled in the art may conceive other ways of constructing the simplified regular expression corresponding to the complex regular expression.

Referring back to FIG. 4, after the corresponding simplified expression is constructed for each complex regular expression in step S420, a simplified state machine is compiled based on the corresponding simplified expression of each complex regular expression and remaining regular expressions in the regular expression set except for the complex regular expressions. That is, the simplified regular expression replaces the corresponding complex regular expression in the regular expression set and thus the simplified state machine is compiled. Any method known in the art which is used to compile a DFA state machine based on the regular expression may be used to compile the simplified state machine. In this case, as the simplified regular expression replaces the complex regular expression, interaction between the regular expressions may not cause over-expansion of the number of states in the simplified state machine.

Subsequently, a corresponding substate machine is compiled for each complex regular expression in step S440. Any method known in this field which is used to compile the DFA state machine based on the regular expression may be also used to compile the substate machine. After that, the method for data matching 400 goes to step S450, where the simplified state machine obtained in step S430 and the substate machine obtained in step S440 are used for data matching.

Figure 5:
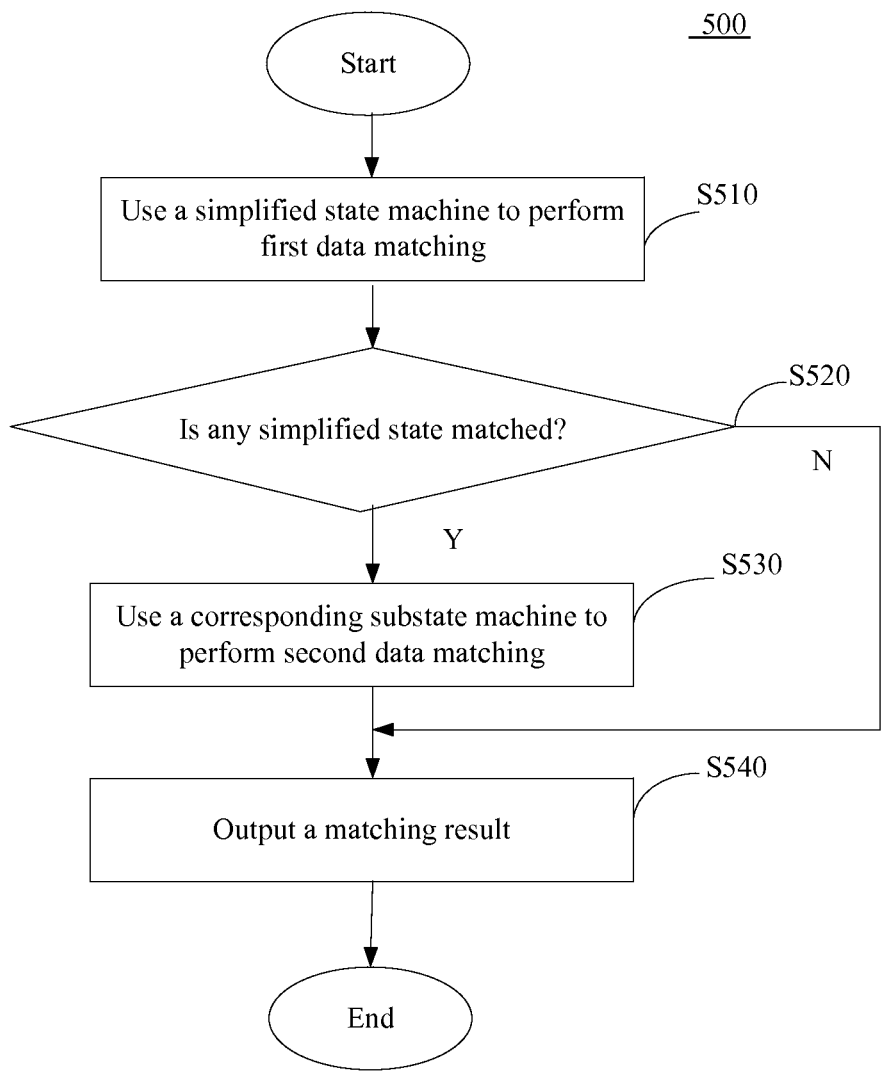
FIG. 5 is a flow chart of the steps for matching data based on a simplified state machine and a substate machine in the method illustrated in FIG. 4.

Optionally, FIG. 5 illustrates a flow chart of a method for realizing step S450 in the FIG. 4. As illustrated in FIG. 5, the method starts with step S510, where the simplified state machine is used to perform first data matching; moreover, it is judged in step S520 whether any simplified regular expression is indicated to be matched in a data matching result of the first data matching. If it is determined that one or more simplified regular expressions are matched in step S520, the substate machine corresponding to the complex regular expression which corresponds to the one or more matched simplified regular expressions is used to respectively perform second data matching in step 530 so as to obtain a matching result corresponding to the complex regular expression. Subsequently, the matching result is output in step S540, where only the regular expressions determined as matched in step S510 except the simplified regular expression and the complex regular expression determined as matched in step S530 are determined as matched regular expressions. That is, in method 500, if the simplified regular expression is found to be matched during the first data matching, the corresponding complex regular expression needs to be used to perform the second data matching so as to determine.

For example, it is supposed that 20 regular expressions including pattern1, pattern2 . . . and pattern20 are needed for matching data on a specific segment of network data, where each regular expression represents one type of attack. It is supposed that pattern1 to pattern17 are simplified expressions which may not cause state expansion, while pattern18, pattern19 and pattern20 are complex expressions which may cause the state expansion. According to the method for data matching of the embodiments of the present invention as illustrated in FIG. 4 and the FIG. 5, the complex regular expressions including the pattern18, the pattern19 and the pattern20 are firstly searched out in step S420; subsequently, simplified regular expressions newpattern18, newpattern19 and newpattern20 respectively corresponding to the complex regular expressions the pattern18, the pattern 19 and the pattern20 are constructed in step S420, where the simplified regular expressions may not cause state expansion. After that, the pattern1 to the pattern17, and the newpattern18, the newpattern19 and the newpattern20 serve as a set of rules in step S430 to compile and obtain a simplified state machine statemachine1; moreover, the pattern18, the pattern19 and the pattern20, as independent regular expressions are respectively compiled and substate machines including state-machine 2, state-machine 3 and state-machine 4 are obtained in step S440. In step S450, by reference to the matching process described in the FIG. 5, the simplified state machine statemachine 1 is firstly used in step S510 for matching. If it is determined that none of the pattern18, the pattern19 and the pattern20 is matched in step 520, the whole matching process is finished; and a matching result in step S510 is output as a final matching result in step S540. On the contrary, if at least one of the newpattern18, the newpattern19 and the newpattern20 is determined to be matched in step 520, for example, the newpattern18 is matched, the state-machine 2 needs to be used for second matching in step S530 so as to determine whether the input data is matched up with the pattern18; and the final matching result which is output in step S540 is a union set of the first matching result in step S510 and the second matching result in step S530.

According to the method for data matching of the present invention, a problem of sharply expansion of the number of states will not occur to the simplified state machine and each substate machine.

However, a certain efficiency loss may be introduced according to the method for data matching of the present invention as data matching may be performed on the same segment of data for more than once; for example, if the newpattern18 is matched when performing data matching by use of the simplified state-machine 1 in the previous example, the state-machine 2 needs to be used for the second data matching so as to determine whether pattern18 is matched. To make the same segment of data passing through two state machines means to scan the same segment of data twice, and this will reduce system efficiency. In order to minimize the reduction of the system efficiency, in step S420 of the method according to the present invention, the simplified regular expression needs to be capable of describing key features of the complex regular expression and thus a probability that the data matches with the simplified regular expression but not matches with the complex regular expression is lowered as far as possible to improve the system efficiency.

Figure 6:
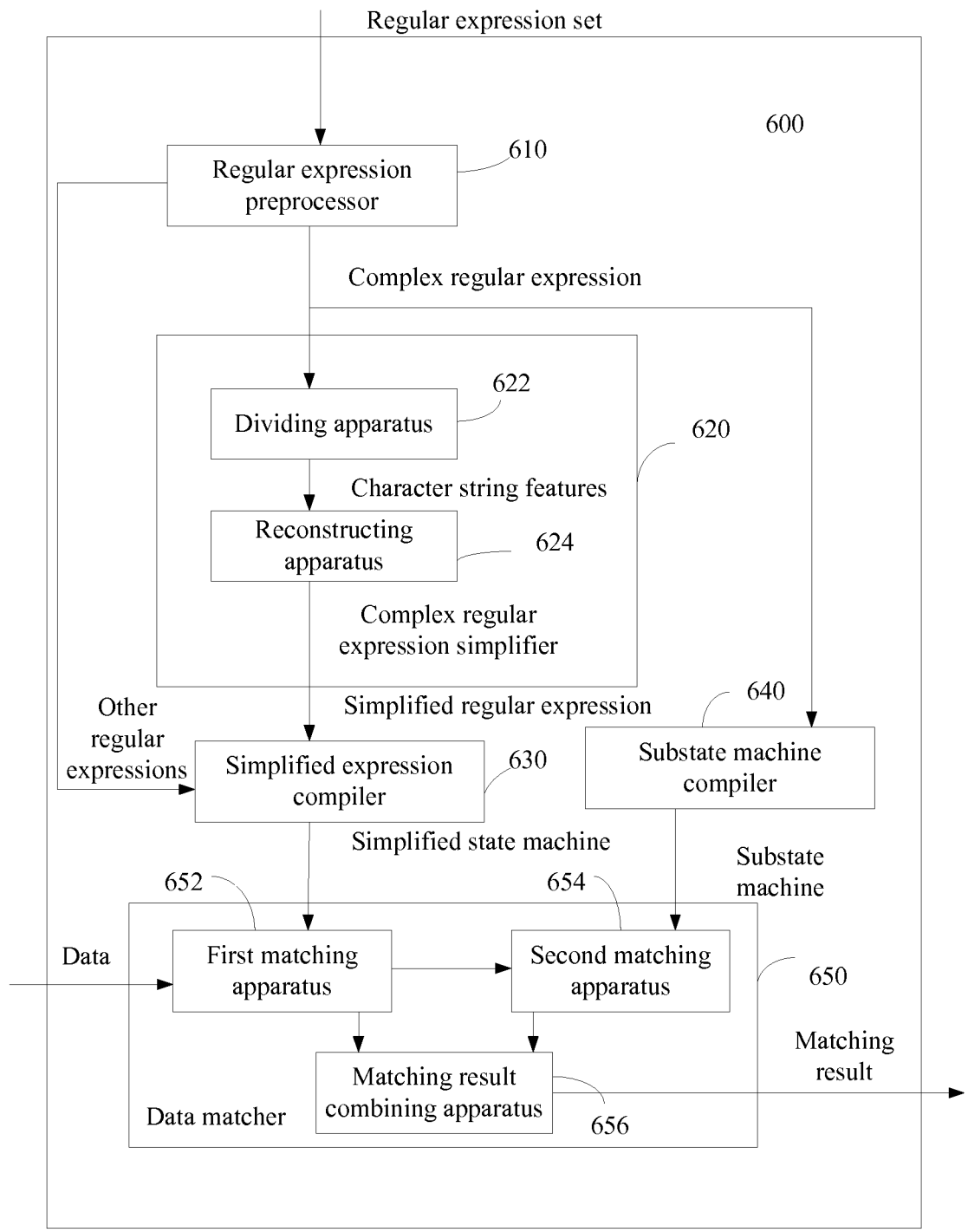
FIG. 6 is a schematic block diagram of a device for data matching based on a regular expression set according to an embodiment of the present invention.

FIG. 6 schematically illustrates a device 600 for data matching based on a regular expression set according to an embodiment of the present invention. The data matching device 600 is configured to perform the method for data matching illustrated in FIG. 4 and FIG. 5 above. As illustrated in FIG. 6, the device 600 for data matching includes a regular expression set preprocessor 610, configured to search, in the regular expression set comprising a plurality of regular expressions, for one or more complex regular expressions which cause a sharp increase in the number of states generated based on the regular expression during interaction. Features of the complex regular expression have been described in detail and will not be described here again. Optionally, the regular expression set preprocessor 610 may perform step S410 in FIG. 4.

The device 600 for data matching further includes a complex regular expression simplifier 620, configured to construct a corresponding simplified expression for each of the one or more complex regular expressions searched out by the regular expression set preprocessor 610. The complex regular expression simplifier 620 may construct the simplified expression as described in step S420. Specifically, according to an embodiment of the present invention, the complex regular expression simplifier 620 includes a dividing apparatus 622 configured to divide the complex regular expression into one or more character string features separated by one or more regular features. The complex regular expression simplifier 620 further includes a reconstructing apparatus 624 configured to connect the one or more character string features according to a sequence of the one or more character string features in the complex regular expression so as to construct the simplified regular expression. Optionally, the reconstructing apparatus 624 connects all the character string features of the complex regular expression so as to construct the simplified regular expression. However, according to another embodiment of the present invention, the reconstructing apparatus 624 may also connect only some important character string features and ignore some unimportant or inconspicuous character string features.

The device 600 for data matching further includes a simplified expression compiler 630 and a substate machine compiler 640. The simplified expression compiler 630 compiles a simplified state machine based on the simplified expression from the complex regular expression simplifier 620 and remaining regular expressions in the regular expression set except for the complex regular expression provided by the regular expression set preprocessor 610. While the substate machine compiler 640 compiles a corresponding substate machine for each of the one or more complex regular expressions searched out by the regular expression set preprocessor 610. Both the simplified expression compiler 630 and the substate machine compiler 640 may employ any means known in the art for compiling the regular expression so as to generate a DFA state machine. Optionally, the simplified expression compiler 630 and the substate machine compiler 640 may respectively perform step S430 and step S440 described above by reference to FIG. 4.

A data matcher 650 in the device 600 for data matching matches data based on the simplified state machine from the simplified expression compiler 630 and the substate machine from the substate machine compiler 640. Optionally, the data matcher 650 may perform step S450 described above by reference to FIG. 4.

According to an embodiment of the present invention, the data matcher 650 includes a first matching apparatus 652, a second matching apparatus 654 and a matching result combining apparatus 656. The first matching apparatus 652 uses the simplified state machine from the simplified expression compiler 630 to perform first data matching. If a first data matching result of the first matching apparatus 652 indicates that the simplified expression corresponding to the complex regular expression is matched, the second matching apparatus 654 uses the substate machine which is from the substate machine compiler 640 and corresponds to the complex regular expression corresponding to the matched simplified expression to perform second data matching. The matching result combining apparatus 656 outputs a union set of a matching result of the first matching apparatus 652 and a matching result of the second matching apparatus 654 as a final data matching result.

According to the device for data matching of the present invention, a matching process is divided into two stages: in a first stage, the simplified regular expression replaces the complex regular expression to perform matching; and only if the simplified regular expression is matched in the first stage, matching which uses an actual complex regular expression will be performed in a second stage. In this way, not only no state expansion occurs, but also no great reduction of matching efficiency arises.

The method for data matching and the device for data matching based on the regular expression set according to the present invention may be applied in various applications where data matching is required. As described above, the method and device for data matching based on the regular expression set are needed particularly in the field of network intrusion detection. For example, a device for network intrusion detection according to an embodiment of the present invention may include the device for data matching so as to use each regular expression corresponding to a network intrusion mode to perform data matching on received network data, thereby judging whether the network data is network intrusion data. A method for network intrusion detection according to an embodiment of the present invention may include steps of: obtaining network data; using the method for data matching of the present invention to match the network data according to the regular expression set corresponding to network intrusion mode; and judging whether the network data is network intrusion data based on a data matching result.

It should be noted that in each component of the device for data matching of the present invention, the components are divided logically according to functions to be implemented thereof. However, the present invention is not restricted by this. Each component may be divided or combined again according to demands. For example, a plurality of components may be combined into a single component; or, a plurality of components may be further decomposed into more sub-components.

Each embodiment of the present invention may be implemented by hardware or implemented by a software module operating on one or more processors or implemented by a combination of the hardware and the software module. A person skilled in the art should understand that partial or complete functions of some or all components in the device for data matching according to the embodiment of the present invention may be implemented by using a microprocessor or a digital signal processor (DSP) in practice. The present invention may be further implemented as a program of a device or apparatus (such as a computer program and a computer program product) to be configured to partially or completely perform the method described here. The program realizing the present invention may be stored in a computer readable medium, or may have one or more signal types. The signals may be downloaded from an Internet website or provided by a carrier signal or provided in any other form.

It should be noted that the embodiments above are illustrations rather than limitations on the present invention; moreover, a person skilled in the art may design substituting embodiments in case of not deflecting from scope of accompanying claims. In the claims, any reference signs in brackets shall not be construed as a limitation on the claims. The word "comprise" or a variation thereof does not exclude existence of elements or steps not listed in the claims. The word "one" followed by an element does not exclude existence of more than one such element. The present invention may be implemented by hardware including a plurality of different elements as well as a properly programmed computer. In a claim listing a plurality of apparatus units, several of the apparatus units may be specifically implemented by a same hardware item. Use of words "first", "second", "third", and the like, does not represent any sequence preference. The words may be explained as names.

Finally it should be noted that: the embodiments are only to explain technical solutions of the present invention, but not intended to limit the technical solutions of the present invention. Although the present invention is explained specifically by referring to the embodiments, a person having ordinary skill in the art should understand that modifications or equivalent replacements may also be made to the technical solutions or part of technical features therein in the embodiments. However, these modifications or equivalent replacements do not make essence of a corresponding technical solution depart from spirits and scopes of technical solutions of the embodiments of the present invention.

What is claimed is:

1. A method for network intrusion detection by data matching based on a regular expression set comprising one or more regular expressions, implemented by a processor executing instructions stored on a non-transitory processor readable medium, comprising steps of:

searching in the regular expression set for one or more complex regular expressions which cause expansion in the number of states generated based on the regular expression during interaction;

constructing a corresponding simplified expression for each of the one or more searched-out complex regular expressions by connecting all character string feature of the searched-out complex regular expression and deleting a character string feature that appears frequently;

compiling only one simplified state machine based on the constructed simplified expression and remaining regular expressions in the regular expression set except for the one or more searched-out complex regular expressions;

compiling one or more substate machines, wherein each of the one or more substate machines is compiled based on a corresponding one of the one or more complex regular expressions;

obtaining network data; and matching the obtained network data based on the simplified state machine and the one or more substate machines to judge whether the network data is network intrusion data.

2. The method according to claim 1, wherein:

the one or more complex regular expressions comprise one or more of the following types of regular expressions:

a regular expression in such a form as subpattern1.*subpattern2;

a regular expression in such a form as subpattern1.+subpattern2;

a regular expression in such a form as subpattern{m,n}; and a regular expression in such a form as subpattern{m}.

3. The method according to claim 1, wherein the step of constructing a corresponding simplified expression for each of the one or more searched-out complex regular expressions comprises:

dividing the complex regular expression into one or more character string features separated by one or more regular features, wherein the regular feature refers to a regular syntax in the complex regular expression, and the character string feature refers to a fixed character string present in the complex regular expression and separated by the regular syntax;

connecting the one or more character string features according to a sequence of the one or more character string features in the complex regular expression so as to construct the simplified expression; and deleting the character string feature that appears frequently.

4. The method according to claim 1, wherein the matching the obtained network data based on the simplified state machine and the one or more substate machines to judge whether the network data is network intrusion data comprises steps of:

using the simplified state machine to perform a first data matching;

using the substate machine corresponding to the complex regular expression which corresponds to the simplified expression to perform a second data matching if a result of the first data matching indicates that the network data is matched up with the simplified expression; and judging whether the network data is the network intrusion data according to the result of the first data matching and a result of the second data matching.

5. A device for network intrusion detection by data matching-based on a regular expression set comprising one or more regular expressions, comprising a processor executing instructions stored on a non-transitory processor readable medium to perform functions as a plurality of modules, the plurality of modules comprising:

a regular expression set preprocessor, configured to search, in the regular expression set, for one or more complex regular expressions which cause expansion in the number of states generated based on the regular expression during interaction;

a complex regular expression simplifier, configured to construct a corresponding simplified expression for each of the one or more complex regular expressions searched out by the regular expression set preprocessor by connecting all character string feature of the searched-out complex regular expression and deleting a character string feature that appears frequently;

a simplified expression compiler, configured to compile only one simplified state machine based on the simplified expression from the complex regular expression simplifier and remaining regular expressions in the regular expression set from the regular expression set preprocessor;

a substate machine compiler, configured to compile a corresponding substate machine for each of the one or more complex regular expressions searched out by the regular expression set preprocessor; and a data matcher, configured to obtain network data and match the obtained network data based on the simplified state machine from the simplified expression compiler and the substate machine from the substate machine compiler to judge whether the network data is network intrusion data.

6. The device according to claim 5, wherein the one or more complex regular expressions comprise one or more of the following types of regular expressions:

a regular expression in such a form as subpattern1.*subpattern2;

a regular expression in such a form as subpattern1.+subpattern2;

a regular expression in such a form as subpattern{m,n}; and a regular expression in such a form as subpattern{m}.

7. The device according to claim 5, wherein the complex regular expression simplifier comprises:

a dividing apparatus, configured to divide the complex regular expression into one or more character string features separated by one or more regular features, wherein the regular feature refers to a regular syntax in the complex regular expression, and the character string feature refers to a fixed character string present in the complex regular expression and separated by the regular syntax; and a reconstructing apparatus, configured to connect the one or more character string features according to a sequence of the one or more character string features in the complex regular expression and delete the character string feature that appears frequently, so as to construct the simplified expression.

8. The device according to claim 5, wherein the data matcher comprises:

a first matching apparatus, configured to use the simplified state machine to perform first data matching;

a second matching apparatus, configured to, for the simplified expression indicated to be matched by the first matching apparatus, use the substate machine corresponding to the complex regular expression which corresponds to the simplified expression to perform second data matching; and a matching result combining apparatus, configured to combine a data matching result of the first matching apparatus and a data matching result of the second matching apparatus so as to output a final data matching result to judge whether the network data is the network intrusion data.

9. A non-transitory, processor-readable medium having processor-executable instructions stored thereon for network intrusion detection by data matching based on a regular expression set comprising one or more regular expressions, the processor-executable instructions, when executed by a processor, facilitating the performance of the following:

searching in the regular expression set for one or more complex regular expressions which cause expansion in the number of states generated based on the regular expression during interaction;

constructing a corresponding simplified expression for each of the one or more searched-out complex regular expressions by connecting all character string feature of the searched-out complex regular expression and deleting a character string feature that appears frequently;

compiling only one simplified state machine based on the constructed simplified expression and remaining regular expressions in the regular expression set except for the one or more searched-out complex regular expressions;

compiling one or more substate machines, wherein each of the one or more substate machines is compiled based on a corresponding one of the one or more complex regular expressions;

obtaining network data; and matching the obtained network data based on the simplified state machine and the one or more substate machines to judge whether the network data is network intrusion data.

10. The non-transitory according to claim 9, wherein:
the one or more complex regular expressions comprise one or more of the following types of regular expressions:
a regular expression in such a form as subpattern1.*subpattern2;
a regular expression in such a form as subpattern1.+subpattern2;
a regular expression in such a form as subpattern{m,n}; and
a regular expression in such a form as subpattern{m}.

11. The non-transitory according to claim 9, wherein the constructing a corresponding simplified expression for each of the one or more searched-out complex regular expressions comprises:
dividing the complex regular expression into one or more character string features separated by one or more regular features, wherein the regular feature refers to a regular syntax in the complex regular expression, and the character string feature refers to a fixed character string present in the complex regular expression and separated by the regular syntax;
connecting the one or more character string features according to a sequence of the one or more conspicuous character string features in the complex regular expression so as to construct the simplified expression; and
deleting the character string feature that appears frequently.

12. The non-transitory according to claim 9, wherein the matching the obtained network data based on the simplified state machine and the one or more substate machines to judge whether the network data is network intrusion data comprises steps of:
using the simplified state machine to perform a first data matching;
using the substate machine corresponding to the complex regular expression which corresponds to the simplified expression to perform a second data matching if a result of the first data matching indicates that the network data is matched up with the simplified expression; and
judging whether the network data is the network intrusion data according to the result of the first data matching and a result of the second data matching.

* * * * *